(12) United States Patent
Gordon et al.

(10) Patent No.: US 11,853,791 B2
(45) Date of Patent: Dec. 26, 2023

(54) TRANSACTION SCHEDULING FOR A USER DATA CACHE BY ASSESSING UPDATE CRITERIA

(71) Applicant: BILLGO, INC., Fort Collins, CO (US)

(72) Inventors: Stephen Ryan Gordon, Woodinville, WA (US); Terry Lentz, Jr., Redmond, WA (US); Kalyanaraman Ganesan, Redmond, WA (US); Richard Yiu-Sai Chung, Kirkland, WA (US)

(73) Assignee: BILLGO, INC., Fort Collins, TX (US)

( * ) Notice: Subject to any disclaimer, the term of this patent is extended or adjusted under 35 U.S.C. 154(b) by 0 days.

(21) Appl. No.: 17/169,844

(22) Filed: Feb. 8, 2021

(65) Prior Publication Data

US 2021/0406059 A1 Dec. 30, 2021

Related U.S. Application Data

(63) Continuation of application No. 16/040,706, filed on Jul. 20, 2018, now Pat. No. 10,915,354.

(51) Int. Cl.
| | | |
|---|---|---|
| *G06F 9/50* | (2006.01) | |
| *G06F 9/46* | (2006.01) | |
| *G06F 13/24* | (2006.01) | |
| *G06F 9/54* | (2006.01) | |

(52) U.S. Cl.
CPC ............ *G06F 9/467* (2013.01); *G06F 9/5083* (2013.01); *G06F 9/542* (2013.01); *G06F 13/24* (2013.01)

(58) Field of Classification Search
CPC ..................................................... G06F 9/467
See application file for complete search history.

(56) References Cited

U.S. PATENT DOCUMENTS

| | | |
|---|---|---|
| 8,973,102 B2 | 3/2015 | Jakobsson |
| 9,213,967 B1 | 12/2015 | Ferguson |
| 9,774,587 B2 | 9/2017 | Kumar et al. |
| 2016/0253216 A1* | 9/2016 | Greenberger ......... G06F 9/4881 718/103 |

* cited by examiner

*Primary Examiner* — Charlie Sun (57) ABSTRACT

Transaction scheduling is described for a user data cache by assessing update criteria. In one example an event records memory stores a list of events each corresponding to performance of a transaction at a remote resource for a user. The memory has criteria for each event and a criterion value for each criterion and event combination. An event manager assesses criteria for each event by performing an operation on the stored criterion value for each criterion and event combination, assigning a score for each criterion and event combination, and compiling the assigned scores to generate a composite score for each event. The events are ordered based on the respective composite scores and executed in the ordered sequence by performing a corresponding transaction at remote resource. Updated criterion values are stored for executed events.

20 Claims, 5 Drawing Sheets

|         | RESOURCE 1 | RESOURCE 2 | RESOURCE 3 | ... |
|---------|------------|------------|------------|-----|
| USER 1  | EVENT 1    | —          | EVENT 5    |     |
| USER 2  | EVENT 2    | EVENT 3    | —          |     |
| USER 3  | EVENT 6    | —          | EVENT 4    |     |
| ⋮       |            |            |            |     |

FIG. 3

|             | EVENT 1 | | EVENT 2 | | EVENT 3 | |
|-------------|---------|-------|---------|-------|---------|---------|
| CRITERION 1 | VALUE   | SCORE | —       | SCORE | —       | DEFAULT |
| CRITERION 2 | VALUE   | SCORE | VALUE   | SCORE | VALUE   | SCORE   |
| ⋮           |         |       |         |       |         |         |
| SCORE       | TOTAL   |       | TOTAL   |       | TOTAL   |         |

FIG. 4

|         | RESOURCE 1 | RESOURCE 2 | RESOURCE 3 | ... |
|---------|------------|------------|------------|-----|
| USER 1  | VALUE      | —          | VALUE      |     |
| USER 2  | VALUE      | VALUE      | —          |     |
| USER 3  | VALUE      | —          | VALUE      |     |
| ⋮       |            |            |            |     |

TRANSACTION SCHEDULING FOR A USER DATA CACHE BY ASSESSING UPDATE CRITERIA

FIELD

The present description relates to the field of data collection from multiple remote resources for presentation to users on demand and in particular to scheduling that data collection.

BACKGROUND

Mobile connectivity allows users to have ready access to current information from many different sources. At the same time, it can be inconvenient to access and to reconcile information from a large number of different, unrelated, or disjoint resources. Security or privacy constraints can also make it difficult or impossible to obtain current information conveniently and quickly from different remote resources and from different locations on behalf of user devices.

Data aggregation systems have been established to first obtain information for a user and to then provide that information upon demand. The data is collected from the many different resources by an aggregator. To collect personal or private information, the aggregator may access some resources using personal user information or credentials. If there are multiple different resources, then the data aggregator is able to remotely perform tasks which might be difficult or inconvenient for the user to perform especially with a mobile device. The aggregator adds value by consolidating all of the information with a single user login, single access address, or single user authentication in a single display that allows for comparison and reconciliation of different sources of information.

After the data aggregator has collected information for the user, the user may then access the aggregator as a remote service through an application or browser interface on a mobile or fixed connected device. Upon ensuring the user's identity and credentials, the aggregator is able to provide the aggregated information that has been gathered from the many different users. This allows greater convenience for the user.

In some cases, the remote service is more than a data aggregator and allows for a wide variety of interactions with other individuals and resources. In such cases, the remote service provides a convenient mobile portal for many different types of personal, private, and secure transactions.

BRIEF DESCRIPTION OF THE DRAWING FIGURES

The present invention is illustrated by way of example in the accompanying drawings. The drawings should be understood as illustrative rather than limiting.

DETAILED DESCRIPTION

Users that request current information through a mobile or fixed portal hope to receive the most current available information from all of the available remote information resources, such as remote websites and other digital repositories of information important to the user. However, each point of information requires a read or write transaction with the remote resource that provides the current information. When performing transactions for the user at remote resources, it would be simple to perform these transactions on demand from the user, however, this would delay the availability of the information until after all of the transactions have been performed. In some cases, a remote resource might be temporarily unavailable and so, no current information could be provided to the user.

To overcome this information access delay, some data aggregators generate a store of information that is ready to provide to the user on demand. The information is gathered before the user requests access so that the information is already prepared in advance. The information may be gathered in advance based on a timer (e.g. once a day) for each user or for each remote resource.

However, this approach is inefficient and wastes computational and communications resources. While some of the information may be updated at the remote resource very frequently, e.g. multiple times per day, some of the information will change only infrequently and some data will change on a predetermined schedule, such as weekly or monthly. At the same time, some users will access information daily or more frequently, while other users will only access data after several days or weeks. The described system manages a process that ensures that current valid information is available in advance consistent with user desires.

The data management and distribution system described herein identifies user transactions as events. Each event is an access to a remote resource on behalf of a user. Each event is affected by a wide range of considerations that are particular to the transaction, resource, the user, or the communication system. These considerations are referred to herein as criteria.

Many criteria may be described as falling into a small number of groups. A first group may be thought of as user considerations. The user considerations may include things such as how active the user is, i.e. how frequently the user typically requests updated or current information and how frequently the user acts on information that it receives. A similar consideration is the period of time or time duration since the last time that the user accessed the data management and distribution system.

A second group is resource considerations. These may include how frequently the resource updates information, how responsive the resource is to access requests and how reliably information can be retrieved from that resource. The amount of data available may also be a consideration. There may also be connectivity considerations, such as the uptime of the resource, and how many other requests the system, or other systems, may be making of the resource at the same time. If the system is accessing a resource on behalf of many users, then the system can stagger the accesses so that the resource is not overwhelmed. These considerations allow the system to prioritize synchronization activities from among all of the possible resource transactions.

Resource information updates, in some cases, occur on a schedule, such as monthly or weekly. In these cases, the DMDS can store this schedule and use the update schedule as part of the relevant criterion. The system can defer retrieving new information until after the information is updated by the resource based on the schedule. Similarly, in other cases, a resource can inform the DMDS when the resource information has been updated using, for example, a webhook, push notification, or another signaling system. This can be part of the relevant criterion to delay retrieving new information until after the notice is received. Such a notification approach is attractive to the resource to prevent accesses when there is no new data. This can be just one part of a partnership between the DMDS and the resource. The described task distribution system has a list of events stored in memory, which may be a local non-volatile disk or solid state storage or any other memory. Each event can be executed to perform a transaction for a user at a resource. Each event is characterized by a user, a resource, and a transaction to be performed at the resource on behalf of the user when the event is executed. In some cases, the transaction is to retrieve personal or account information about the user from the resource by reading, downloading, or scraping from a downloaded page or file. In other cases, the transaction is to perform an operation on behalf of the user at the resource.

Each event is also characterized by a set of criteria. The criteria each have an associated criterion value which may be determined by characteristics of the resource, characteristics of the user, characteristics of the connection between the resource and the system, or characteristics of the system with respect to the user. When the system receives an interrupt, or some other trigger, it assesses the criteria for each event using the respective criteria values. The system assigns a score to each criterion for each event based on the results of the assessment. The scores are then compiled to provide a composite score for each event.

The composite score is used to order the events, so events with the highest (or lowest, depending on the implementation) score are executed first. The events remain in this order until another assessment is performed, typically in response to receiving an interrupt. The interrupts may be based on a timer. There may also be interrupts based on some other event that causes the ordering to be changed.

The events can be executed within the system or other resources may be used. As an example, an external server system or a set of access servers may be assigned event execution tasks based on proximity, configuration or availability. When an event is executed, new information is created. The type and amount of data will depend on the nature of the event. This updated data will be used to replace the data currently stored in memory.

As an example, a recency, freshness, or execution time stamp value may be generated when an event is executed. This data may be used as an updated value for a recency criterion. The recency value may then be used to score a recency criterion. Generally, a recently executed event will be moved towards the rear of the ordering. The new recency value will, accordingly, cause a different score to be assigned on the next assessment so that the event will be placed later in the priority ordering.

The event execution will also provide a transaction value. Generally, the purpose of the transaction is to obtain or generate the transaction value by reading, writing, downloading, or scraping data from the resource. The transaction value will be a value describing new information, a relationship, or a status between the resource and the user. The transaction value will be stored in a data cache that is associated with the user. After each event execution, the transaction value may be updated in the user data cache so that the cache contains the most recent transaction value and an associated event execution time. The cache is an aggregation of all of the executed events and the most recent transaction values for a particular user. The data cache for each user may be stored in tables of a relational database, in text files with metadata or in any other format.

The synchronized cache may be made available to the user upon request. The cache may be provided on a push basis or a pull basis. For example, if the user has a smartphone app, the app may store the most recently received transaction values. When the user opens the app and requests a refresh, then the smartphone may request the cache and update the transaction values for presentation to the user. The smartphone may receive all of the cache values or only those that have been updated since the last refresh.

The cache may be reviewed by the user using the smartphone app. The user may also command the app to send a request to the system to execute any particular events and obtain a further updated transaction value. The event may be executed to obtain more recent information or to perform a more complex transaction with the resource. The criteria values and transaction values will then be updated again at the system memory. The update transaction values may then be pushed to the user or the system may wait for a pull request from the smartphone app. While a smartphone app is described herein, the app may be for a desktop, notebook, tablet or any other system. Alternatively, the user may be supported through a browser interface or any other suitable local computer interface to the system.

Figure 1:
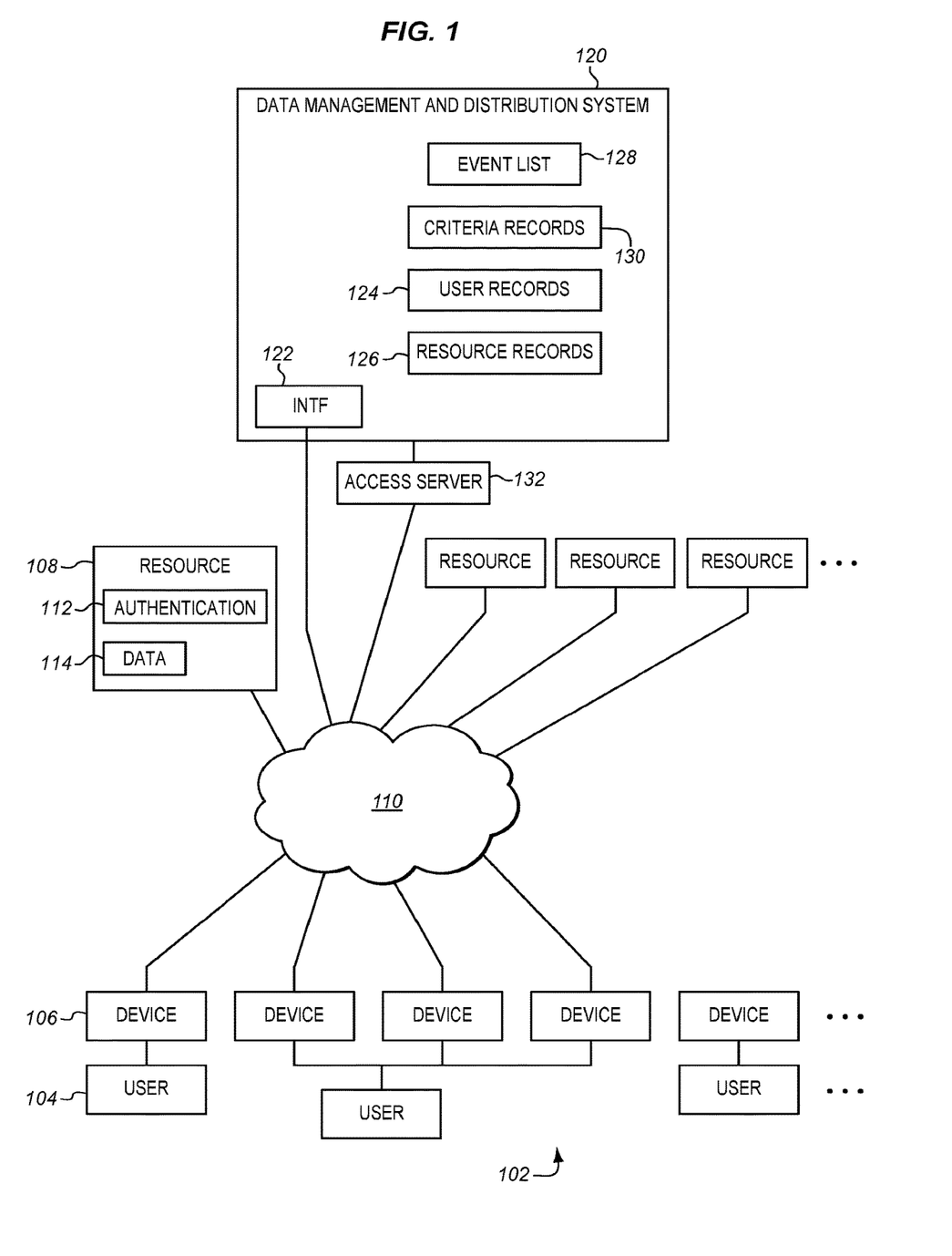
FIG. 1 is a block diagram of a networked system 102 in which user transactions are available through a network.

FIG. 1 is a block diagram of a networked system 102 in which user transactions are available through a network, such as the Internet. There are many users 104 which each have one or more network attached devices 106, such as a smartphone, tablet, notebook computer, or desktop workstation. The users in turn have accounts with any one or more of a plurality of remote resources 108. In some cases, a user may be thought of as a person with a smart phone, but the word user is used and defined herein as any entity that has a relationship with a resource. This may be an individual with a data terminal, including a smart phone or it may be a business, a group, an agency, or any other type of entity.

The remote resources may be accessible to the user through the network 110 using a network attached device. To access the resource, the user performs an authentication through the device with an authentication module 112 of the resource. After being authenticated, the user is then able to access data 114 that would be served to the user or perform transactions at the resource using a combination of data on the resource and data provided by the user.

A data management and distribution system (DMDS) 120 is logically positioned between the users and the resources and connects to both through the network. The network allows users to obtain direct access to a resource or to use the DMDS for transactions and data updates with the resources. The system 120 may be used instead of the direct connection between a user and a resource or as an optional path for that connection. The DMDS may be implemented as one or more computer or server systems in various ways including virtual machines, mobile application emulators, device application programming interfaces (APIs), and various other devices and systems. As shown in FIG. 1, the DMDS 120 includes a network interface 122 to access multiple user devices and resources. The interface may be able to generate multiple instances and sessions or to access other resources to implement additional instances. The DMDS also includes user records 124, resource records 126, an event list 128 and event criteria records 130. In this way, the system acts, in part, as a massive cache for all of the user and resource combinations. The DMDS continually updates that cache in an intelligent manner as a background process to serving users.

One or more access servers 132 may be locally or remotely located for the DMDS. The access server is coupled to the DMDS directly, through the network, or both to perform access tasks with the resources and with users. The DMDS can assign access tasks to the access servers to off-load the tasks from the DMDS. The events described herein may be treated as discrete tasks that can be assigned arbitrarily to available resources. The results from each event, the transaction value and the criterion values may then be delivered to the DMDS for further use.

The user records 124 and resource records 126 include the information necessary to establish a session with the respective user and resource, including address, identification, and authentication records. The user records may also include all of the data retrieved from the resources so that the resource data is ready to serve to a user on a push or pull basis. The user records may also include information about transactions that a user may desire to perform at the resource. The resource records may include information about the resource such as data update schedules, availability schedules, access bandwidth capabilities, etc. The event list is a sorted list of events as described above in which each event is a resource access. The event is executed on the corresponding resource to perform the associated transaction. The event criteria as described above are used to sort the events in response to any of a variety of interrupts.

Figure 2:
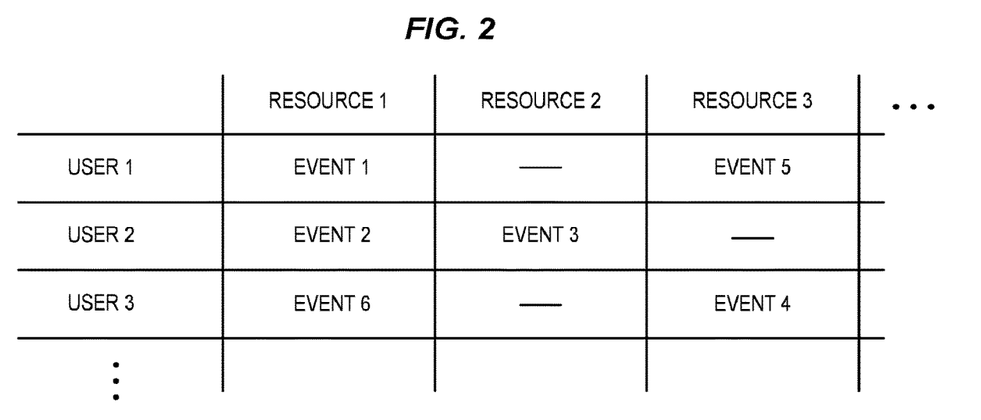
FIG. 2 is a portion of a table of users against resources.

FIG. 2 is a portion of a table of users against resources. As shown each user may have one or more events at each of the known resources. Each user and resource combination provides for the possibility of an event but does not require an event. As an example user 1 may have account credentials with resource 1 so that there is an event of requesting data from resource 1 about a current status for user 1. On the other hand user 1 does not have an event with respect to resource 2. This may be because user 1 does not have an account, credentials, data, or any other relationship with resource 2. Similarly, while user 2 has an event with resource 1 and resource 2, there is no event with respect to resource 3.

While three users and three resources are shown, there may be many more. If there is more than one event for a user with a single particular resource, then the resource may be represented as two instances of the same resource. Alternatively, there may be two events in the table for the one resource. As mentioned above, when an event is executed, then a transaction is performed with that resource for the benefit of the particular user. The event may be repeated at regular intervals or on a priority basis by sorting events in a priority based on scoring. While FIGS. 2-4 are shown as tables for illustration purposes a variety of different data structures may be used to suit particular implementations.

Figure 3:
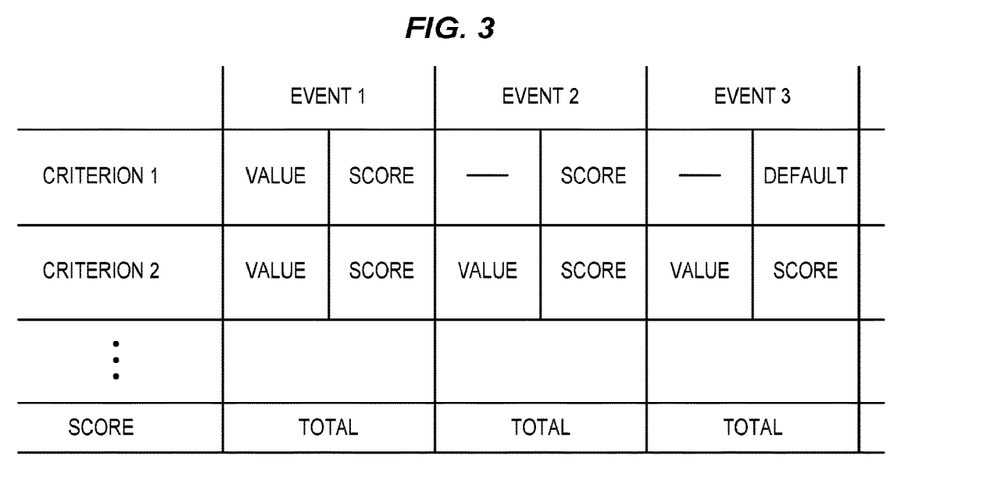
FIG. 3 is a portion of a table of criteria against events.
Figure 4:
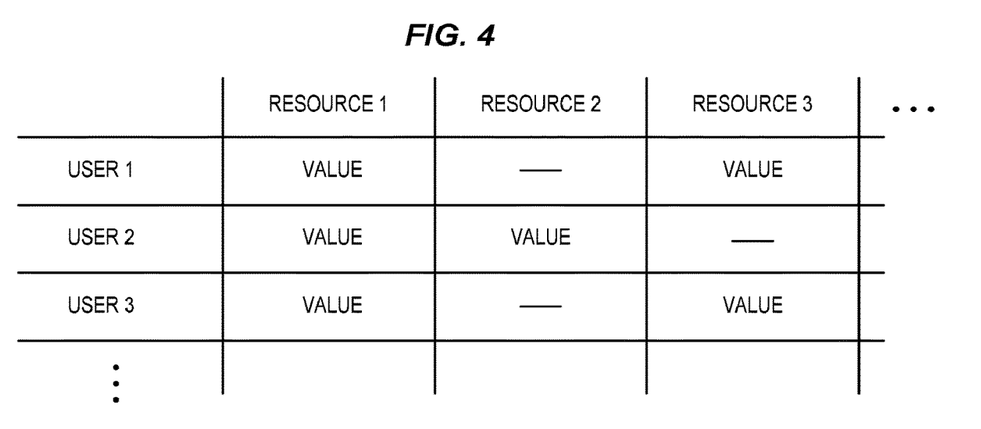
FIG. 4 is a portion of a table showing a data cache maintained for each user.

FIG. 3 is a portion of a table of criteria against events. As shown, for each of the events in FIG. 2, there may be multiple criteria that may be used for scoring each event. The different criteria are shown as a column so that scores for each criterion may be summed down the column to obtain a total score for the particular event. As indicated in Table 2, even though two different events are at the same resource or for the same user, they can be scored differently and may receive different scores.

As shown, for each combination of an event and criterion, there may be a value. The value may be used to determine the score. However, not every criterion has a value and there may nevertheless be a score for the criterion. In some cases, there is no score that can be determined for a particular value. In such a case, a default score may be provided. The default score ensures that the totals for different events can be compared. Depending on the particular criterion, the default score may be high or low or some intermediate value.

Using the table of FIG. 3, or a functionally similar construct, each event is independently scored using multiple criteria or dimensions. A score is determined for each dimension using the associated value and the scores for each dimension of each event are compiled to obtain a composite score for each event. The events may then be prioritized based on the score for each event. Some dimensions may not apply to all events. Accordingly, for dimensions that do not apply, the event is given a default score for that criterion.

In practice, some of the criterion values of FIG. 3 may be fixed and some may be updated periodically or upon executing the related event. As an example, one criterion may be a date and time upon which a resource generates new data. If this date is not affected by accesses to the resource, then this criterion can be fixed as e.g. the first or last day of each month. Another resource might update data multiple times per day with no particular schedule or with a schedule based on user activity that is not predictable. In such a case, the value may indicate recency of the last data access. The value may be a time of the last access, an elapsed time since the last access or some similar value. The score will increase with time since the last access. The criterion value will also be updated with the next event execution to show very high recency immediately after the event. The value or score may also indicate some measure of success or failure. For example, the last access may be five minutes ago, but the last successful access may be an hour ago, and as such could inform when the next access attempt should be scheduled.

The scores may be determined using a factor that is appropriate for each criterion. The factor may be selected to reflect the nature of the value and the nature of the respective criteria. As an example, each criterion value may be stated in units. For units of minutes, the factor may be different than for units of days. Similarly, a criterion that is closely tied to urgency may have a larger factor than one that is not. An availability factor, indicating whether a resource is or is not available may have a very high factor compared to other factors. This would help to prevent futile attempts to access the resource.

The criteria may be used to keep the user information up-to-date with reasonable economy of network access. The criteria may reflect user signals, resource signals, connectivity signals and limiting management among other factors. In some cases, the criteria may use one or more values in order to be accurately scored.

In the area of user signals, a criterion may be user activity. In this case, the criterion may reflect how frequently the user has requested an update of the data. A user that requests updated data more frequently will require more frequent data updates from the corresponding resources. This activity rate may be monitored over some duration so that an average or mean request frequency can be determined. This value will be unique to the user but may or may not be unique to each resource. The user may request updated data for all resources each time. If the user accesses the DMDS for new data twice daily, then update events may be given a higher priority so that the data is fresher. If the user requests new data once per week, then the data does not need to be updated several times per day. A similar criterion is elapsed time since the last user update request. As the time becomes longer, then the next user request becomes sooner. In these cases, a higher synchronization frequency and a longer time since the last synchronization, will both cause a higher priority in the event sort order.

For resource-based criteria, the resource may update the data based on a schedule that may be the same for all users or different for different users. In such a scenario, there may be a criterion that ranks the recency of this resource data update time. After the resource update, then the score will increase for each day after the update. Before the update the score may be low or zero. In some cases, the resource data is invoice or statement data. For some obligations, monthly or bi-monthly billing is used that is the same for all users but for other obligations, the monthly billing is based on some other data such as an account date so that bills or invoices are issued to different users each day or week. Using the billing schedule, an event of obtaining the invoice from the resource may be prioritized as more urgent as time passes after the invoice issues.

Alternatively, one or more resources in particular may partner with the DMDS and provide a particular date for all or one of the users. The resource may send a webhook, push notification or other indicator that something has changed on the resource for one or more users. This may be used as a data update date or time. The criterion value will be related to the indicated update time or to the time of receiving the notification from the resource that the resource data has been updated. This can be processed using recency in a manner similar to the scheduled update except that the update time is determined using external data not a schedule.

Similarly, bills or invoices may have a due date. Payments after the due date may be assessed a penalty. For an event of paying an invoice using user funds, the event may be prioritized as increasingly more urgent as the due date approaches.

For connectivity criteria, scores may be accorded for the DMDS' ability to reach a resource or an ability to successfully retrieve date from the resource by reading, downloading, or scraping data. There may be times or circumstances when a particular resource is not readily available due to issues at the resource, overall bandwidth constraints or other reasons. A difficult resource may be scored lower to reduce the frequency of efforts to retrieve the data.

For limiting management criteria, scores may be accorded for the number of events that are scheduled for a particular resource. It may be possible for the system to overwhelm a resource with too many concurrent or nearly concurrent data requests. A resource for which there are many concurrent events may have a lower score so that the more important data accesses are performed first.

FIG. 4 is a portion of a table showing a data cache maintained for each user. The table show users against resources. For each user, there is a transaction value for each resource. There may optionally be a time stamp for each value. Some, and perhaps most, of the resources do not have a value as in FIG. 2 because the respective user does not have an account, credentials, or data with that resource. In other cases, there may not be a value because no data is available from that resource. The data cache shows the data that is ready to be provided to each user upon request. As described above, by executing events in the background, the data cache can be made to be immediately available upon request by the user. In some embodiments, a user request may serve as an interrupt to cause the DMDS to execute events for some of the resources to collect missing or stale data. While the DMDS is collecting that part of the user data, the other data, already collected, may be served to the user.

Figure 5:
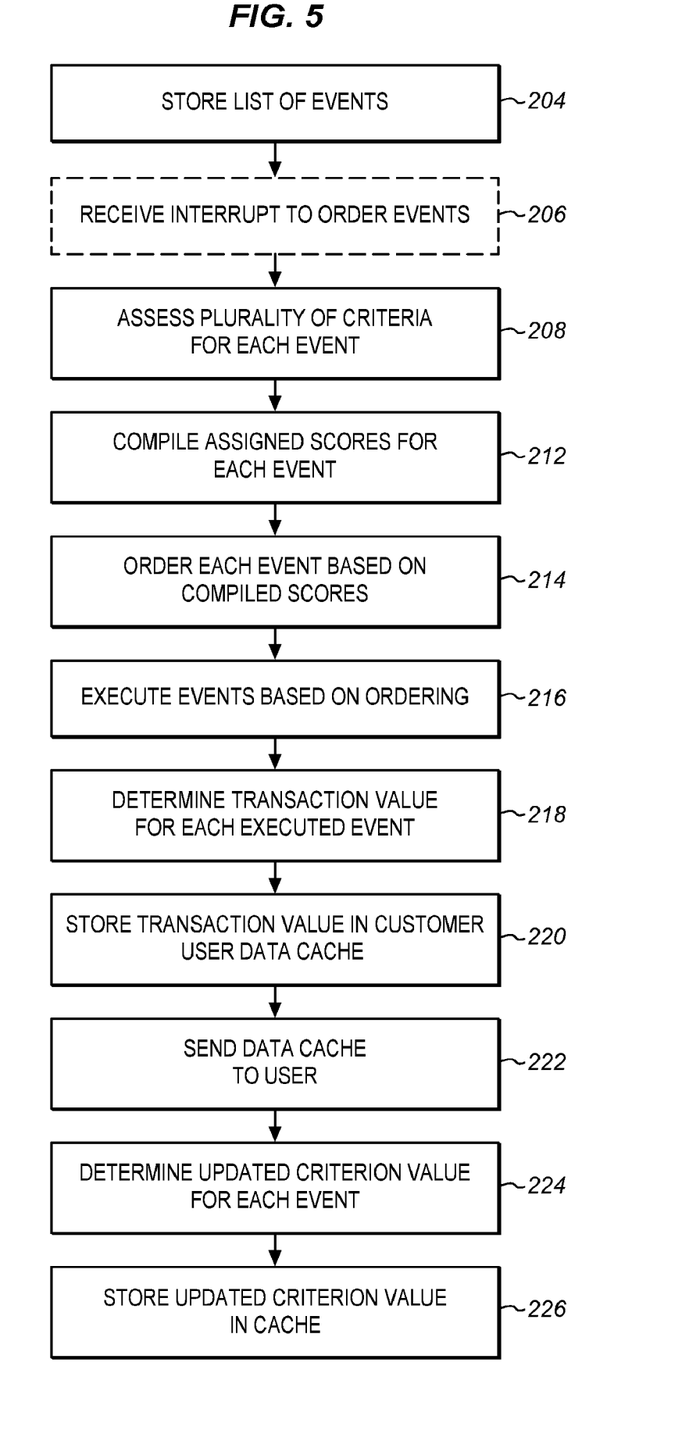
FIG. 5 is a process flow diagram indicating operations that may be performed by a DMDS through a network interface.

FIG. 5 is a process flow diagram indicating operations that may be performed by a DMDS through a network interface. Such a process may be performed on a single server system or tasks may be distributed to multiple server or computer systems and to multiple network connections. At 204 a list of events is stored in a memory of the system. Each event corresponds to a performance of a transaction at a resource for a user. The event list is compiled based on the users. Each user registers or enrolls with the service, i.e. the DMDS, and then indicates the resources that it would like the service to connect with. The service then creates an event for transactions with each resource for that user.

With a large number of users, there may be multiple users that use the same resource. As an example, if the resource is a local utility company, then all of the users within the service area of the local utility company will be served by and billed by the company. Multiple users within the service area may request that the local utility company be included as a resource within the service. In the same way, a major lending company may serve users over a wide geographical area and so there may be many users in different areas with accounts at the lending company that will indicate that the lending company should be a resource within the service. The service may then execute events of checking invoices or balances and also of paying against those invoices and balances.

At 206, the system optionally receives an interrupt to order the events. The system may then assess the criteria for each event in response to the interrupt. Interrupts may be generated internally or by external devices. The interrupt may be due to a change in factors that are used to order events, such as a change in network connectivity or resource availability. The interrupt may also be generated in response to external requests, such as a user request for the data cache or a user resource request. The system may additionally or alternatively order the events in response to a timer or in accordance with a schedule or in response to another occurrence, such as a configuration change, resource change, user change or other occurrence. These may affect the system using an interrupt or through another mechanism.

When the system determines that the time is appropriate, for example from an interrupt, then at 208 it assesses the plurality of criteria for each event and at 210 assigns a score for each criterion and event combination. The scores may be assigned in a variety of different ways. In some embodiments, a factor is applied to a criterion value that is stored in the memory for each respective criterion and event combination. The factor indicates the importance of the particular criterion and the units that are used for the factored value. In other words, the factor weights the criterion and normalizes the value. There may be more than one factor, one for the weight and another for normalizing or scaling.

The value is tied to the nature of the respective criterion. Some factors may be common to many different resources while other factors may not apply to some resources. One example factor for some resources may be the recentness of executing the respective event. If the resource data changes frequently, then, over time, executing an event on the resource becomes more urgent. Similarly, if the user is updating data into the resource, then, over time, the update becomes more urgent. There may be other types of resources or criteria for which an urgency can be attributed to the associated criterion.

On the other hand if the resource updates data on a schedule, such as weekly or monthly, then recentness is not relevant in the same way. In this case, the event should not be executed until after the next resource data update. The recency criterion does not apply or the value must be adjusted based on the schedule so that the value is very low or zero after an update and then becomes very high after the resource data is updated.

At 212 the assigned scores are compiled for each event. In this operation the score for each criterion, including default or zero scores are combined in some way. If the scores are already weighted and scaled, then they may simply be added. However, other combinations may be used such as averaging, taking the most significant bits, or some other combination. The sums may be truncated or divided by a common value or factored before being stored.

At 214 each event is ordered based on the compiled scores. In some cases, there may be events that have the same compiled scores. These may be ranked at random, ranked using a scrambled order of the respective users, or in any other way. At 216, the events are then executed in a sequence that is based on the ordering. Typically, the sequence will match the ordering. In some embodiments, multiple access servers are used to access the resources. Accordingly, after ranking the events, execution is arranged by an event manger. The event manager may execute some, all or none of the events directly through a network interface or arrange the execution by distributing the events, in whole or in part, to access servers to execute the events in the established priority. The order between different access servers may not be determined so that each access server executes each event in the assigned sequence without regard to the actions of other access servers. A similar approach may be taken using different network interfaces of a single server system. The access servers update the corresponding transaction data and criteria or dimensional data for each event after executing an event.

Event execution performs a transaction at a resource. As mentioned, this transaction may be retrieving data from the resource or posting data at the resource. The system will typically perform an authentication process at the resource in order to obtain or post the data at the resource. In some cases, the system may both post data such as a payment amount and also retrieve data such as an outstanding, due, or billed amount. In other cases, the system may post other types of data and collect validation, confirmation, or responses from the resource.

The posting data transaction may be posting data such as paying a bill on the resource. This kind of transaction may be much more time-sensitive and urgent than retrieving data off the resource by reading or scraping. It may be scheduled as urgent by the DMDS. In this case, data is not read or scraped but written and the criteria value may be very high for an urgency criterion. After the posting, the new balance may be read from the resource and posted to the data cache.

At 218, a transaction value is determined for each executed event. These values are collected and then at 220 they are stored in a data cache for the respective user. The cache is then ready or almost ready to deliver to the user upon request at 222. When the user logs in to the service, i.e. the DMDS, the data in the cache is available to deliver to the user immediately. Some of the data may be known to be stale, such as data that is updated on a predetermined schedule. This may be indicated to the user while the DMDS schedules an immediate read of that data from the resource. Multiple resources may be accessed in parallel which the user device may not be able to do. The stale data may then be updated as soon as the new data is available. Such a synchronization may be treated in the same way as any other event so that the transaction value and the criteria values are updated after the respective event is executed.

In addition to updating the user cache, after executing an event at 216, a new criterion value may be generated at 224. As an example, for a recency criterion, there will be a new time stamp for the most recent execution of the event. This new updated recency value may then be stored in the memory as the new criterion value in association with the respective criterion and event at 226. The new value will be used for assessing the criteria the next time.

Historically, such a system is reactive and responds to a user request by then updating the information. To update the information, the system then connects to the various related resources and provides the updated information. Similarly, if a user requests that a transaction be performed, then the user waits until the transaction is completed and receives a confirmation. This historical approach may work well for some types of services. However, there is an inherent delay between the time of a data request and then obtaining and delivering the requested updates. If a resource is busy or unavailable or if there are connectivity issues, then the system may not be able to deliver complete information when it is desired by the user. In the same way, if the system executes a transaction on user command, the corresponding resource may be overwhelmed with other user requests at the same time.

The system described herein prepares for update transactions with resources in the background. There is a data cache for each user that is updated by executing events before the user asks for that data. Transaction requests from the user can be ordered in the same way so that the requested transaction is performed in the background as resource availability and other priorities permit.

The difficulty of accessing remote resources can be helped by provisioning more access servers and more network interfaces to access all of the resources in parallel. However, there is another problem with accessing the data that cannot be solved by using more or bigger servers. Each resource will have a limited capability to accept user credentials and provide data. By carefully ordering the accesses, as described, the capabilities of the resources are also accommodated.

Figure 6:
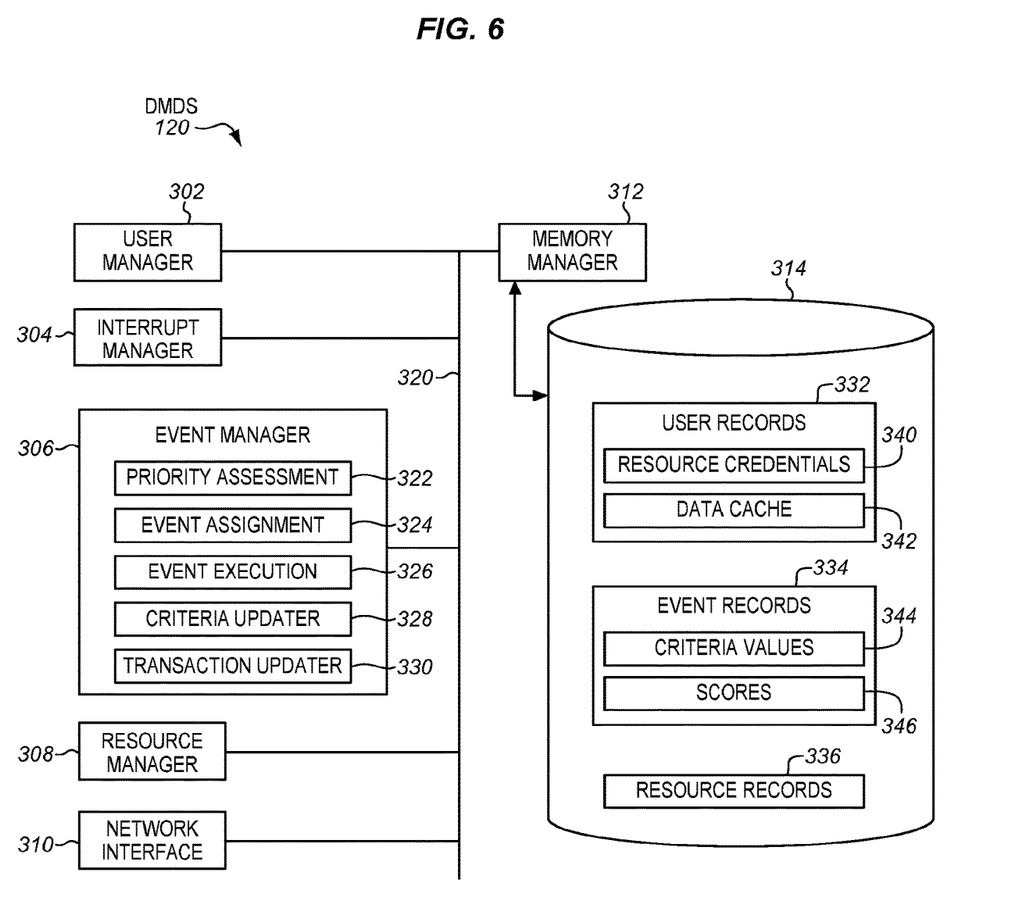
FIG. 6 is a block diagram view of a data management and distribution system.

FIG. 6 is a block diagram view of the DMDS in more detail. The DMDS has a user manager 302, an interrupt manager 304, an event manager 306, a resource manager 308 and a network interface 310. These are coupled to each other and also to a memory system through a bus 320. The memory system has a memory manager 312 and a memory 314 which may be a mass data store that is local or remote. The memory includes user records 332, event records 334, and resource records 336. These components and modules are representative of the possible capabilities of the DMDS. There may be more or fewer components and modules.

The user manager 302 manages all of the user records 332 and manages interaction with individual users. The user manager maintains the stored resource credentials 340 of each user and maintains the data cache 342 for each user. The user manager manages access by each user to the DMDS, maintains resource credentials and provides the data cache information to each respective user. The user manager also provides information to the criteria values 344 of the event records 334 when a user accesses the respective data cache.

The interrupt manager 304 receives interrupts and may also generate timer events. The interrupts cause a score assessment to occur as described above. The assessment is performed by the event manager 306. The event manager tracks and prioritizes the events and ensures that the corresponding transactions are performed for each event as appropriate. The event manager includes priority assessment to combine scores for each event store them in the event record scores 346 and rank the events based on the composite scores from the priority assessment. The event manager also includes event assignment to assign events to appropriate access servers or network interfaces for execution. The event manager includes event execution for any events that are executed by the DMDS using the resource credentials 340 and not by a separate access server. A criteria updater updates the criteria values stored in the event records 334 for each criterion after an event is executed. A transaction updater ensures that transaction values are updated in the respective user data cache 342 after each event is executed.

The resource manager 308 manages resource records 336 for each resource. This may include update schedules, availability, addresses and any special rules that may apply to any use of any resource.

The network interface 310 allows resources and users to access the DMDS. There may be many instances of the network interface so that many users and resources may be accessed simultaneously. The network interface is coupled to the user manager, event manager and resource manager through the bus 320 to allow the network interface to access and communicate data and resources with other servers, users, and other nodes.

Communication between the components corresponding to user devices, servers, and resources is accomplished over a network of electronic devices connected either physically or wirelessly to transmit digital information from one device to another. Such devices (e.g., end-user devices and/or servers) may include, but are not limited to a desktop computer, a laptop computer, a handheld device or tablet, a cellular telephone, an Internet appliance, or systems equivalent thereto. Exemplary networks include a Local Area Network, a Wide Area Network, an organizational intranet, the Internet, or networks equivalent thereto. The functionality and system components of an exemplary device suitable for use with the network are further explained in conjunction with FIG. 7.

Figure 7:
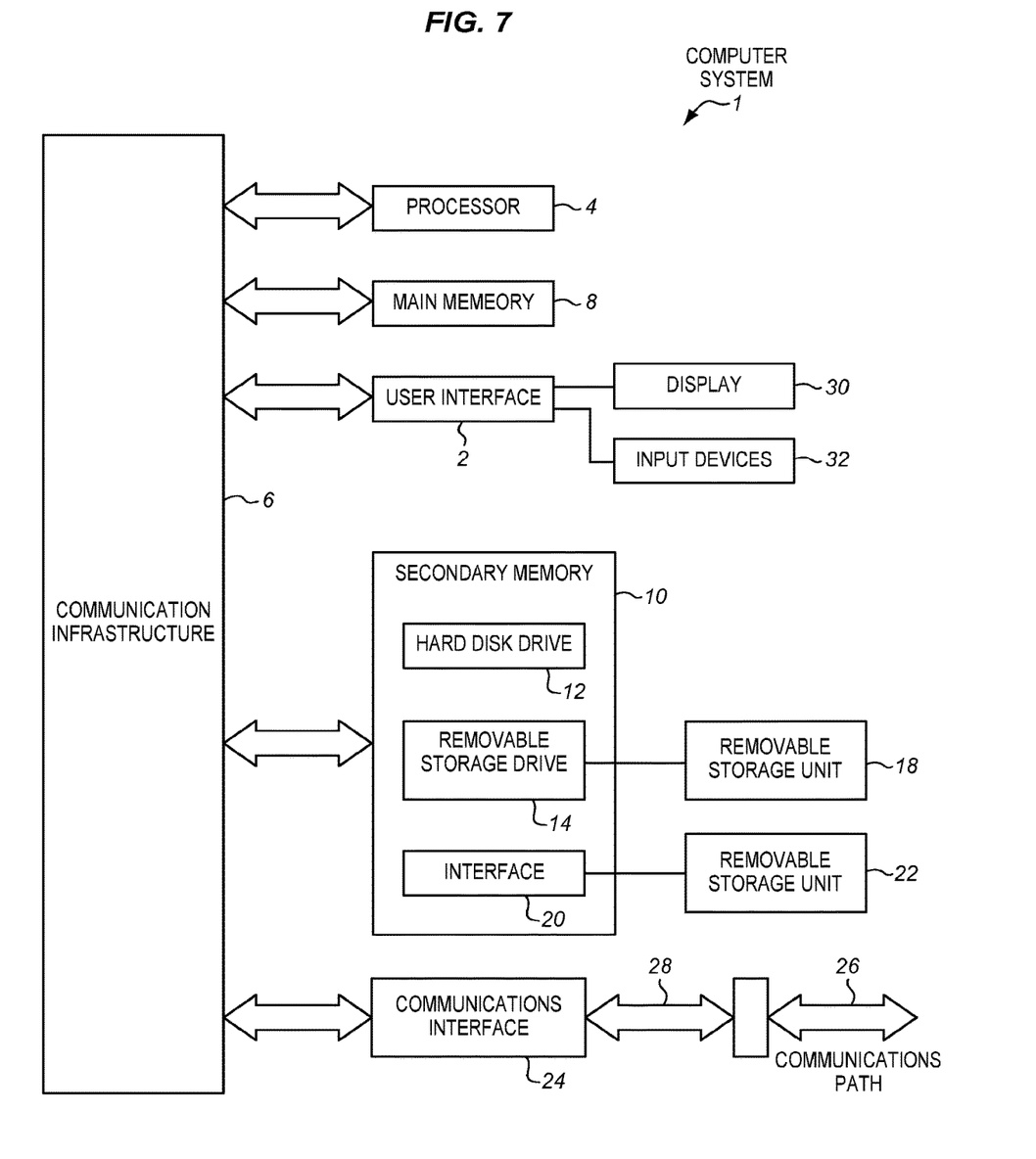
FIG. 7 is a block diagram of a computer system 1 that may be used to implement the components and methods presented above.

FIG. 7 is a block diagram of a computer system 1 that may be used to implement the components and methods presented above. The computer system 1 includes one or more processors, such as processor 4. The processor 4 is connected to a communication infrastructure 6 (e.g., a communications bus, cross-over bar, or network). The computer system 1 can include a user interface 2 that forwards graphics, text, and other data from the communication infrastructure 6 (or from a frame buffer not shown) for display on a local or remote display unit 30 and that communicates user input from user input devices 32, such as touchscreen, touchpad, mouse, keyboard, gesture controller, etc.

The computer system 1 also includes a main memory 8, such as random access memory (RAM), solid state device, and/or hard drive. The computer system 1 may also include a secondary memory 10. The secondary memory 10 may include, for example, a hard disk drive 12 and/or a removable storage drive 14, representing a floppy disk drive, a magnetic tape drive, an optical disk drive, flash memory device, universal serial bus (USB) device, etc. The removable storage drive 14 reads from and/or writes to a removable storage unit 18. The removable storage unit 18 represents a floppy disk, magnetic tape, optical disk, flash memory device, universal serial bus (USB) device, etc., which is read by and written to by the removable storage drive 14. As will be appreciated, the various storage units may include a computer-readable storage medium having stored therein computer software, instructions, and/or data.

In alternative embodiments, the secondary memory 10 may include other similar devices for allowing computer programs or other instructions to be loaded into the computer system 1. Such devices may include, for example, a removable storage unit 22 and an interface 20. Examples of such may include a program cartridge and cartridge, a removable memory chip (such as an erasable programmable read only memory (EPROM), or programmable read only memory (PROM)) and optionally an associated socket, and other removable storage units 22 and interfaces 20, which allow computer software, instructions, and/or data to be transferred from the removable storage unit 22 to the computer system 1.

The computer system 1 may also include a communications interface 24. Communications interface 24 allows computer software, instructions, and/or data to be transferred between the computer system 1 and external devices. Examples of the communications interface 24 may include a modem, a network interface (such as an Ethernet card), a communications port, a Personal Computer Memory Card International Association (PCMCIA) slot and card, etc. Software and data transferred via the communications interface 24 are in the form of signals 28 which may be electronic, electromagnetic, optical or other signals capable of being received by the communications interface 24. These signals 28 are provided to the communications interface 24 via a communications path (e.g., channel) 26. This channel 26 carries signals 28 and may be implemented using wire or cable, fiber optics, a telephone line, a cellular link, a radio frequency (RF) link, a wireless communication link, and other communications channels.

As used herein the terms "computer-readable medium," "computer program medium," and "computer usable medium" are used to generally refer to all nontransitory computer-readable media; such as a removable storage drive 14, removable storage units 18, 22, a hard disk installed in hard disk drive 12, or equivalent computer-readable media. These computer program products provide computer software, instructions, and/or data to the computer system 1. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in the main memory 8 and/or the secondary memory 10. Computer programs may also be received via the communications interface 24. Such computer programs, when executed, enable the computer system 1 to perform the features of the present invention, as discussed herein. In particular, the computer programs, when executed, enable the processor 4 to perform the features of the presented methods. Accordingly, such computer programs represent controllers of the computer system 1. Where appropriate, the processor 4, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into the computer system 1 using the removable storage drive 14, the interface 20, the hard drive 12, the communications interface 24, or equivalents thereof. The control logic (software), when executed by the processor 4, causes the processor 4 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable or computer-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, such descriptions are merely for convenience and such actions in fact result from computing devices, processors, controllers, or other devices executing firmware, software, routines, instructions, etc.

A system, method and apparatus is provided for sorting events and transaction is described. The specific embodiments described in this document represent exemplary instances of the present invention, and are illustrative in nature rather than restrictive. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

Each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The Field, Background, Summary, and Abstract sections are not intended to be used to interpret the claims. Any Summary and Abstract sections may set forth one or more, but not all exemplary embodiments of the present invention as contemplated by the inventor(s), and thus, are not intended to limit the present invention and the appended claims in any way.

Although specific examples and embodiments of the system and methods have been described for purposes of illustration, various modifications can be made without deviating from the present invention. For example, embodiments of the present invention may be applied to many different types of databases, systems and application programs. Moreover, features of one embodiment may be incorporated into other embodiments, even where those features are not described together in a single embodiment within the present document.

What is claimed is:

1. A system comprising:
   at least one processor; and
   memory storing instructions that, when executed by the at least one processor, causes the system to perform a set of operations, the set of operations comprising:
   process criteria for an event of an event records memory to assign a score for an associated criterion and event combination, wherein the event corresponds to a performance of a transaction at a remote resource for the user;
   generate, using the assigned scores, a composite score for the event;
   order events of the event records memory based on a respective composite score for each event;
   arrange execution of the events in a sequence from the event ordering by arranging performance of the corresponding transactions at the corresponding remote resources;
   determine updated criterion values for at least a portion of the executed events based on aspects of the respective transaction; and
   store the updated criterion values in association with the respective criterion and event combination.

2. The apparatus of claim 1, wherein the event manager further comprises a network interface to receive a user request for data and wherein the event manager is configured to generate an interrupt in response to the user request to order the events and wherein the criteria for each event is processed in response to the interrupt.

3. The apparatus of claim 1, wherein assigning a score comprises applying a factor based on an urgency attributed to an associated criterion to the associated criterion value for each respective criterion and event combination.

4. The apparatus of claim 3, wherein compiling the assigned scores comprises adding the scores after applying the factor.

5. A method, comprising:
  storing a list of events in a memory, each event corresponding to a performance of a transaction at a remote resource for a user;
  processing criteria for each event to assign a score for each criterion and event combination;
  generating, using the assigned scores, a composite score for each event;
  ordering the events based on a respective composite score for each event;
  executing the events in a sequence from the event ordering by performing the corresponding transactions at the corresponding remote resources;
  determining updated criterion values for at least a portion of the executed events based on aspects of the respective transaction; and
  storing the updated criterion values in the memory in association with the respective criterion and event combination.

6. The method of claim 5, further comprising:
  determining a transaction value for each executed event;
  storing the transaction value in a data cache for the user of the respective event; and
  sending data of the data cache to the respective user in response to a request from the respective user.

7. The method of claim 5, further comprising:
  receiving an interrupt to order the events and wherein the criteria for each event is processed in response to the interrupt.

8. The method of claim 7, wherein the interrupt is generated in response to a user request for data from the data cache.

9. The method of claim 5, wherein assigning a score comprises applying a factor to a criterion value stored in the memory for each respective criterion and event combination.

10. The method of claim 9, wherein the factor is based on an urgency attributed to the associated criterion.

11. The method of claim 9, wherein compiling the assigned scores comprises adding the scores after applying the factor.

12. The method of claim 5, wherein a criterion value for one of the plurality of criteria is related to a recentness of executing the respective event.

13. The method of claim 5, wherein a criterion value for the criteria is related to a time of receiving a notification from a resource that the resource data has been updated.

14. The method of claim 5, wherein the transaction is reading a value from the resource.

15. The method of claim 5, wherein the transaction is downloading a page from the resource and scraping data from the page.

16. The method of claim 5, wherein the transaction is posting data to the resource.

17. The method of claim 5, wherein the list of events includes a write event and wherein ordering the events comprises ordering the write event as first in the order.

18. A method, comprising:
  processing criteria for each event to assign a score for each criterion and event combination, wherein each event corresponds to performance of a transaction at a remote resource for a user;
  generating, using the assigned scores, a composite score for each event;
  ordering the events based on a respective composite score for each event;
  causing, for the events, performance of a corresponding transaction at a corresponding remote resource;
  determining updated criterion values for at least a portion of the performed events based on the respective transaction; and
  storing the updated criterion values in association with the respective criterion and event combination.

19. The method of claim 18, further comprising:
  determining a transaction value for each performed event;
  storing the transaction value in a data cache for the user of the respective event; and
  sending data of the data cache to the respective user in response to a request from the respective user.

20. The method of claim 18, wherein assigning a score comprises applying a factor to a criterion value for each respective criterion and event combination.

* * * * *